United States Patent [19]
Hurdle

[11] Patent Number: 5,385,439
[45] Date of Patent: Jan. 31, 1995

[54] RADIAL EXTRUSION THREAD-FORMING SCREW

[76] Inventor: Donald R. Hurdle, N 1313 Cottage Dr., Oostburg, Wis. 53070

[21] Appl. No.: 158,954

[22] Filed: Nov. 29, 1993

[51] Int. Cl.⁶ .................. F16B 25/00; F16B 39/30
[52] U.S. Cl. ...................... 411/386; 411/311; 411/416
[58] Field of Search ............ 411/386, 387, 310, 311, 411/309, 412, 413, 416, 426

[56] References Cited

U.S. PATENT DOCUMENTS

| | | |
|---|---|---|
| 3,426,642 | 2/1969 | Phipard, Jr. . |
| 3,527,136 | 9/1970 | Wilson .................. 411/386 X |
| 3,831,415 | 7/1974 | Skierski . |
| 3,935,785 | 2/1976 | Lathom .................. 411/416 X |
| 4,040,328 | 8/1977 | Muenchinger ............ 411/416 X |
| 4,194,430 | 3/1980 | Muenchinger . |
| 4,259,989 | 4/1981 | Capuano . |
| 5,088,869 | 2/1992 | Greenslade ............. 411/386 |

FOREIGN PATENT DOCUMENTS 493495 2/1977 Australia .................. 411/416

*Primary Examiner*—Neill R. Wilson
*Attorney, Agent, or Firm*—Godfrey & Kahn

[57] ABSTRACT

A radial extrusion thread-forming screw (20) comprises a lead thread (36), load-bearing threads (34), and a forming thread (38). The forming thread (38) has a plurality of forming elements (50) that extend outwardly from the forming thread and which are spaced substantially circumferentially equidistant from each other. The forming thread (38) is tapered about its circumference such that the first forming element (50) moves the greatest amount of material and subsequent forming elements (50) move successively less such that each of the forming elements require substantially the same deformation force to move through the workpiece. The forming elements (50) are of a geometry which promotes deformation along slip planes in the material of the workpiece. The lead thread (36) and the load-bearing threads (34) do not have any forming elements (50) located thereon.

39 Claims, 14 Drawing Sheets

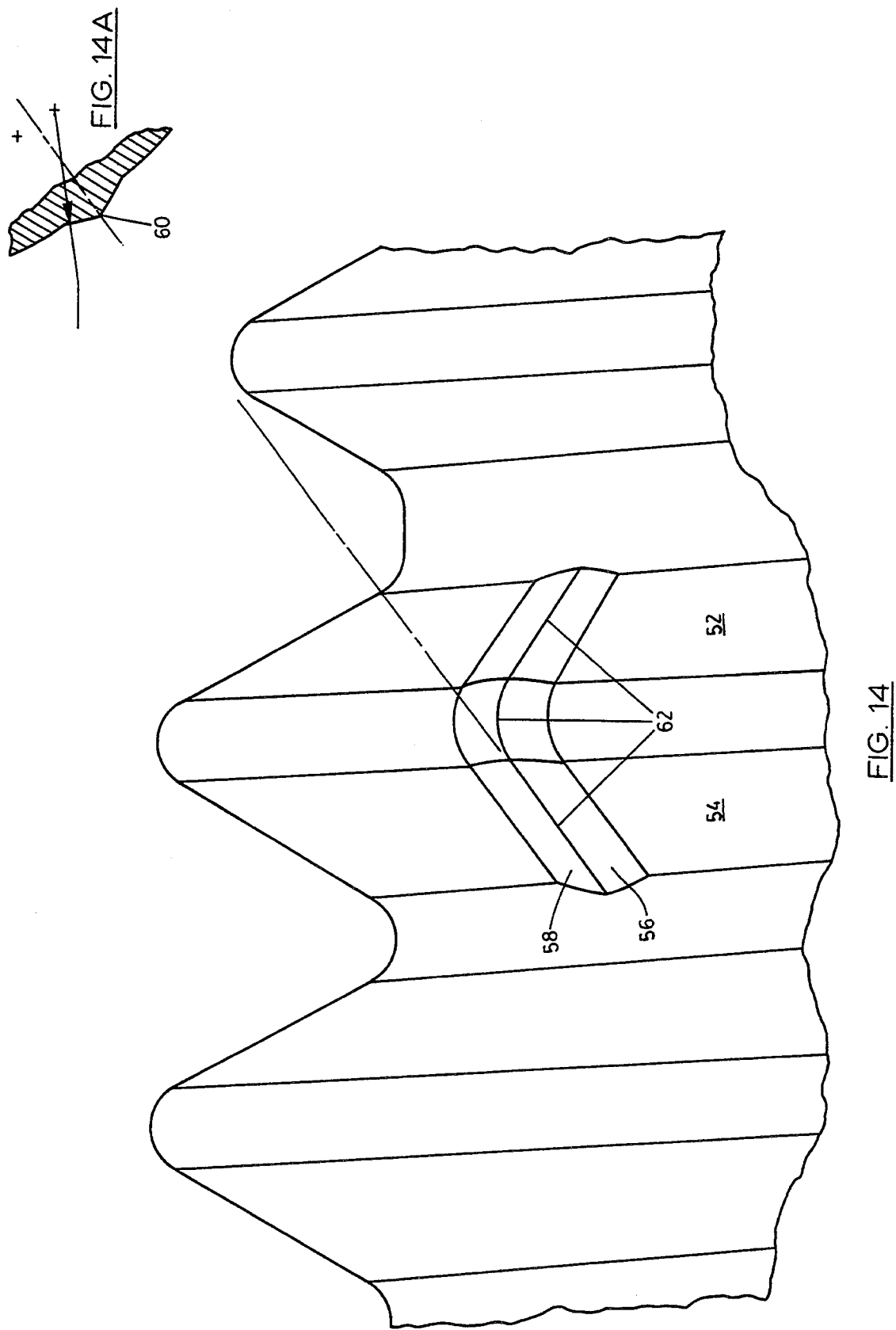

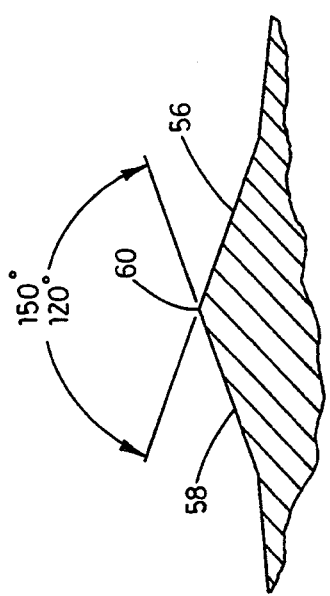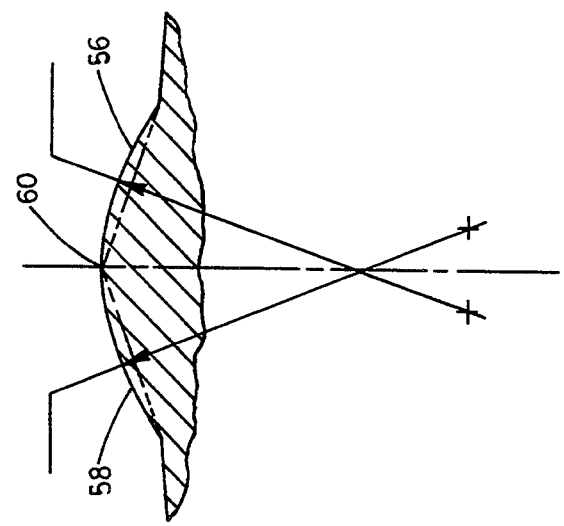

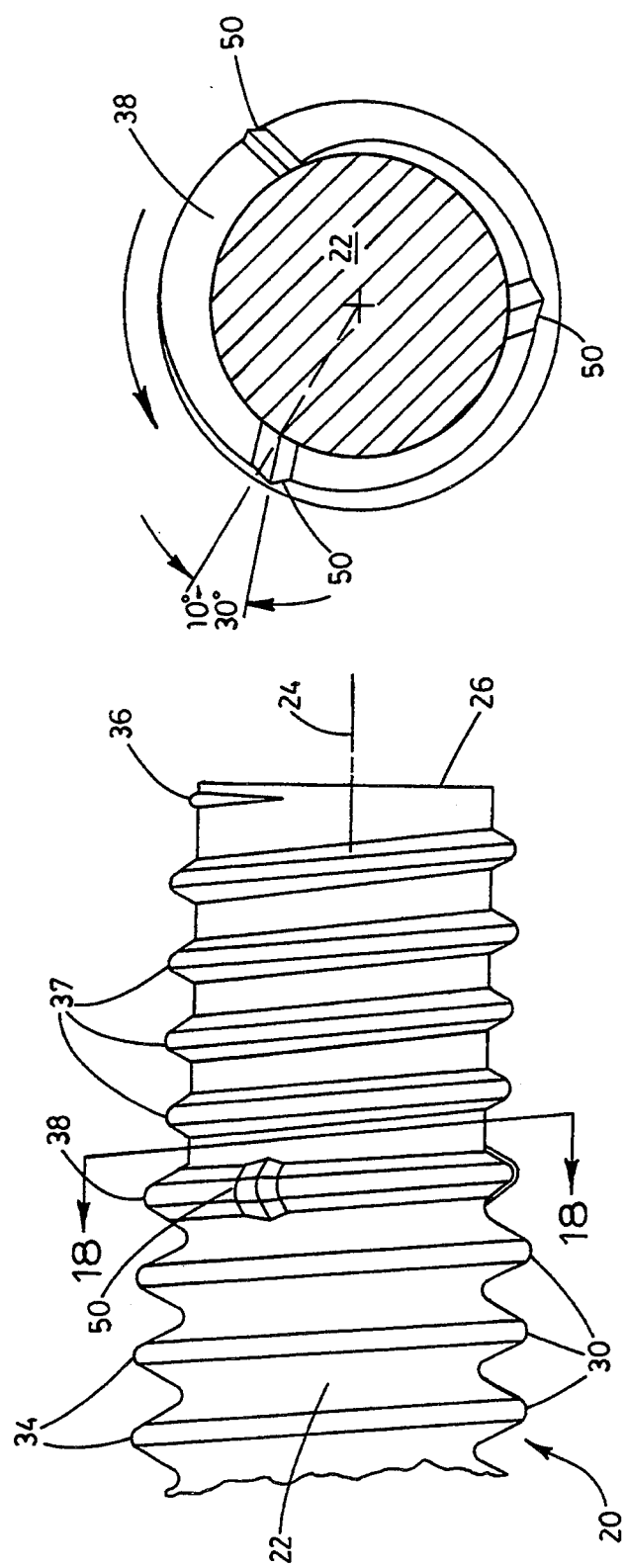

RADIAL EXTRUSION THREAD-FORMING SCREW

FIELD OF THE INVENTION

The present invention relates generally to self-tapping screws and taps, and more particularly to screws and taps which attempt to reduce thread-forming torque.

BACKGROUND OF THE INVENTION

In a cold-forming process which results in work-hardening of a material, successive steps in forming the material become more and more difficult, requiring a greater degree of force. Cold-forming of a material as a result of forming threads by the turning of a screw into a workpiece, requires a successive increase in effort at moving the necessary amount of material.

The prior art shows a number of different approaches to attempt to reduce driving torque. U.S. Pat. No. 3,426,642 issued to Phipard and entitled SELF-TAPPING SCREWS WITH THREAD-FORMING PROJECTIONS is an example of an attempt to reduce driving torque. The Phipard patent employs a plurality of projections or protuberances which are arranged "over at least the work-hardening end portion (emphasis added)." A drawback of having protuberances on a plurality of pitches such as in Phipard results in increased friction, and not in an optimized reduced driving torque.

The Phipard patent further does not solve the problem of a greater degree of force encountered by succeeding protuberances under work-hardening principles, as the required force necessary to move successive protuberances through the workpiece becomes greater and greater, even though the protuberances are the same size. The prior art further does not snow any screws which include protuberances or projections which show any special geometry to reduce the force necessary to promote deformation of the workpiece.

Accordingly, a need has arisen for a screw which takes into full account the considerations of work-hardening, such that the screw is specifically configured to move successive parts of the screw through the workpiece without requiring a greater degree of force. Where protuberances or projections are employed in an attempt to reduce driving friction, generally, a need has arisen for self-tapping screws or taps which promote better deformation of the workpiece.

SUMMARY OF THE INVENTION

In accordance with the present invention, a radial extrusion thread-forming screw comprises a cylindrical shank directed along an axis and having a first end and a second end, a plurality of threads located upon the cylindrical shank, and a means for engaging the cylindrical shank about the axis and turn the article into the workpiece, the means for engaging being located at the second end. The threads each have a crest and a root and include a lead thread beginning at the first end and advancing circumferentially in a spiroid helix about the axis. The crest of the lead thread defines a first major diameter such that the first major diameter at a given position on the lead thread is a diameter of a major cone and the root of the lead thread defines a first minor diameter. The threads further include load-bearing threads beginning at the first end adjacent the lead thread and advancing circumferentially in a helix about the axis toward the second end. The crests and the roots of the load-bearing threads define a second major diameter and a second minor diameter, respectively, the second major diameter and the second minor diameter being the diameters of a major cylinder and a minor cylinder.

The threads further include a forming thread located intermediate the lead thread and the load bearing threads and advancing circumferentially in a spiroid helix toward the second end. The forming thread has a plurality of forming elements that extend outward from the forming thread and which are spaced substantially equidistant from each other. A suitable number of forming elements is four. The crest of the forming thread defines a third major diameter and the forming thread is tapered about its circumference such that the third major diameter increases as it advances toward the second end.

The forming elements are shaped to promote deformation along slip planes in the material of the workpiece upon turning of the article into the workpiece. The forming thread includes a first flank and a second flank which meet to form the crest of the forming thread, the first flank being oriented to face the workpiece and the second flank opposing the workpiece when the article is turned into the workpiece. Each of the forming elements include a first planar surface and a second planar surface which are inclined and which intersect to form an apex having a length, the length of the apex extending across the first flank. An included angle formed by a projected extension of the first planar surface and the second planar surface is between 120° and 150°. Except for the forming thread, the lead thread and the forming thread which engage the workpiece do not have any forming elements.

Because of the taper in the forming thread, the first forming element contacting the surface of the workpiece moves the greatest amount of material, the second forming element moves less, the third even less, etc. Despite the differences in the material being moved, each of the forming elements are requiring substantially the same deformation force to move the workpiece material because of the increased strain hardening encountered by succeeding forming elements. This, as well as the geometry of the forming elements to promote movement along the slip planes of the workpiece material, and the presence of forming elements only on the forming thread, results in a screw which requires less friction and less driving torque to turn the screw into the workpiece.

The threads may further include pilot threads located intermediate the lead thread and the load-bearing threads and advancing circumferentially in a uniform major diameter helix toward the second end. The crests and the roots of the pilot threads define a fourth major diameter and a fourth minor diameter, respectively. The fourth major diameter and the fourth minor diameter are diameters of a fourth major cylinder and a fourth minor cylinder. The fourth major diameter is a lesser diameter than the second major diameter of the load-bearing threads, the pilot threads thereby acting as a means of aligning the screw in the workpiece prior to engagement with the forming thread of the screw.

Further objects, features, and advantages of the invention will be apparent from the following detailed description taken in conjunction with the accompanying drawings.

BRIEF DESCRIPTION OF THE DRAWINGS

In the drawings:

FIG. 14 is a fragmentary, enlarged side elevation view of the forming thread of the present invention and one of the forming elements located thereon.

FIG. 14A is a projection of a lateral cross-section through the forming element of FIG. 14 showing the profile of the forming element.

FIG. 15 is a lateral cross-section showing the profile of an alternate forming element in accordance with the present invention.

FIG. 15A is an enlarged view of the lateral cross-section of the forming element of FIG. 14A, showing the included jangle.

FIG. 17 is a fragmentary, side elevational view of the forming thread of the present invention and an alternate geometry for the forming elements located thereon.

FIG. 18 is a lateral helical cross-section taken along line 18—18 of FIG. 17.

DETAILED DESCRIPTION OF THE PREFERRED EMBODIMENTS

Figure 1:
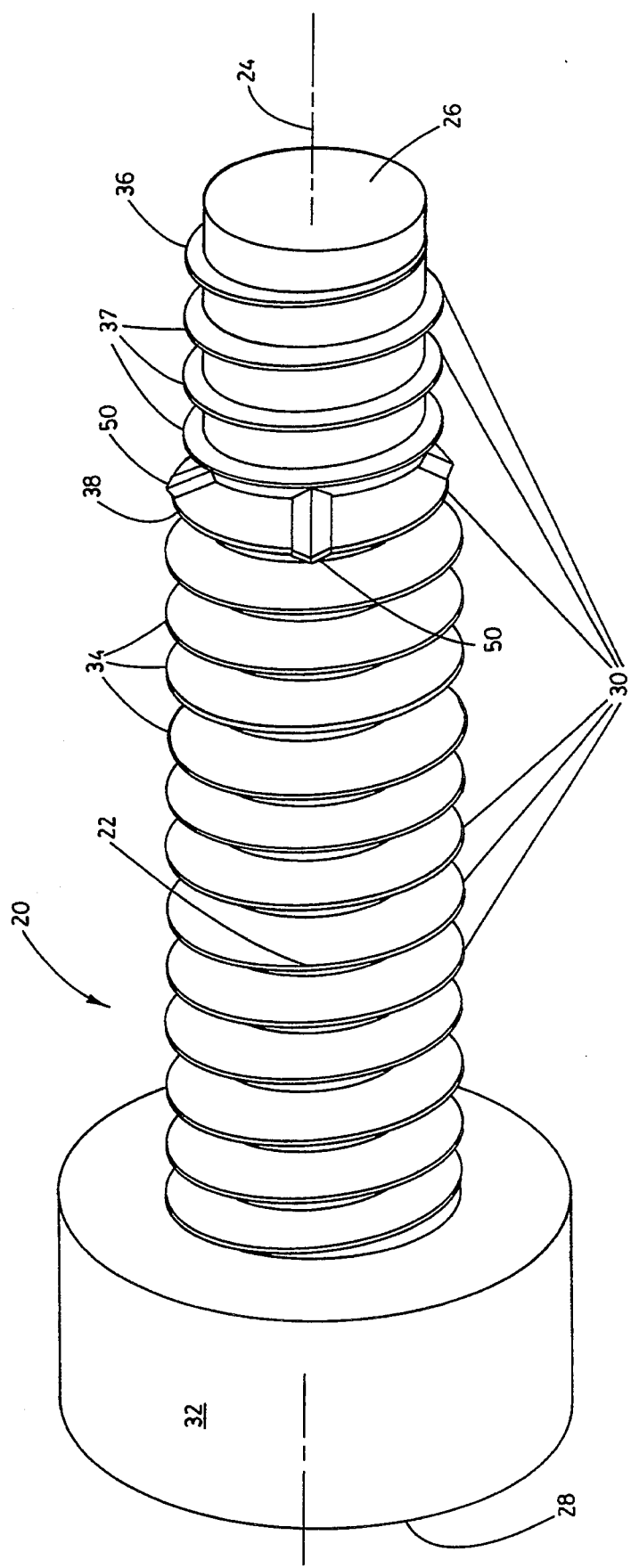
FIG. 1 is an isometric perspective view of a radial extrusion thread-forming screw having four equally-spaced thread-forming elements in accordance with the present invention.
Figure 3:
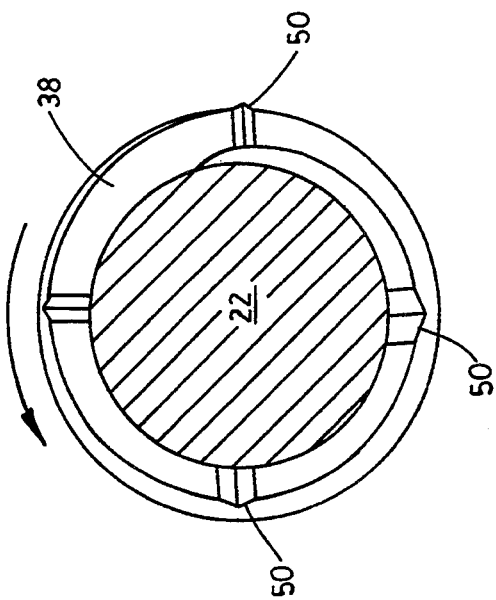
FIG. 3 is a lateral helical cross-section taken along line 3—3 of FIG. 2.
Figure 2:
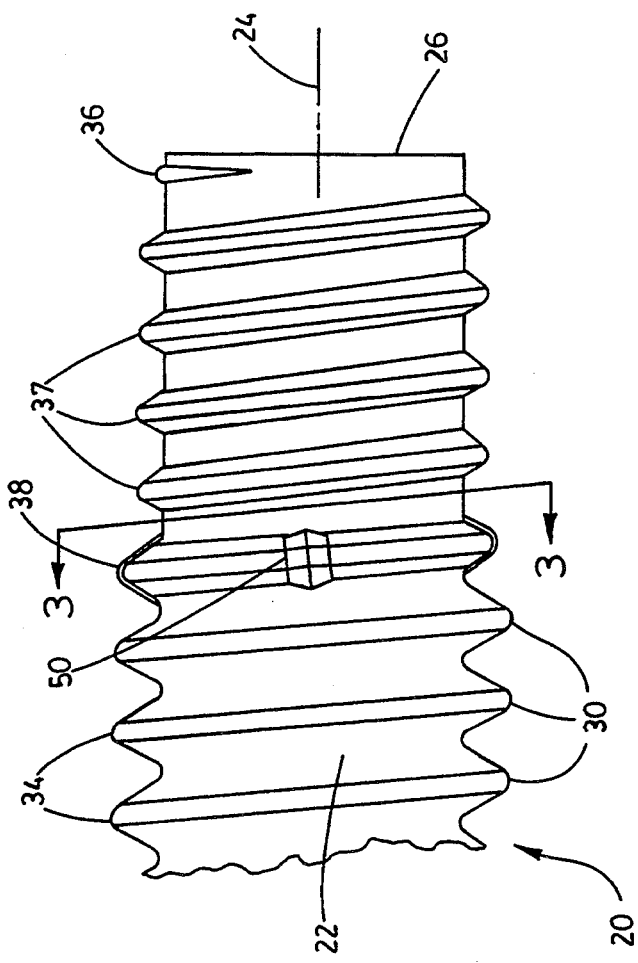
FIG. 2 is a fragmentary, side elevational view of the radial extrusion thread-forming screw of FIG. 1 showing the lead thread, the pilot threads, the forming thread, and certain of the load-bearing threads proximate the forming thread.

With reference to the drawings, a radial extrusion thread-forming screw in accordance with the present invention is shown at 20 in FIGS. 1-3. The radial extrusion thread-forming screw as represented in FIGS. 1-3 has a cylindrical shank 22 directed along a longitudinal axis 24 and has a first end 26 and a second end 28, a plurality of threads 30 formed upon the cylindrical shank 22 and advancing circumferentially in a spiroid helix about the axis 24 from the first end 26 toward the second end 28, and a head portion 32 located at the second end 28. The threads 30 are comprised of load-bearing threads 34, a lead thread or threads 36, pilot threads 37, and a forming thread 38 formed intermediate the lead threads 36 and the load-bearing threads 34. A "thread" is a portion of a screw thread encompassed by one pitch. The "pitch" is the distance measured parallel with the longitudinal axis 24 between corresponding points on adjacent thread forms in the same axial plane and on the same side of the axis 24.

Figure 4:
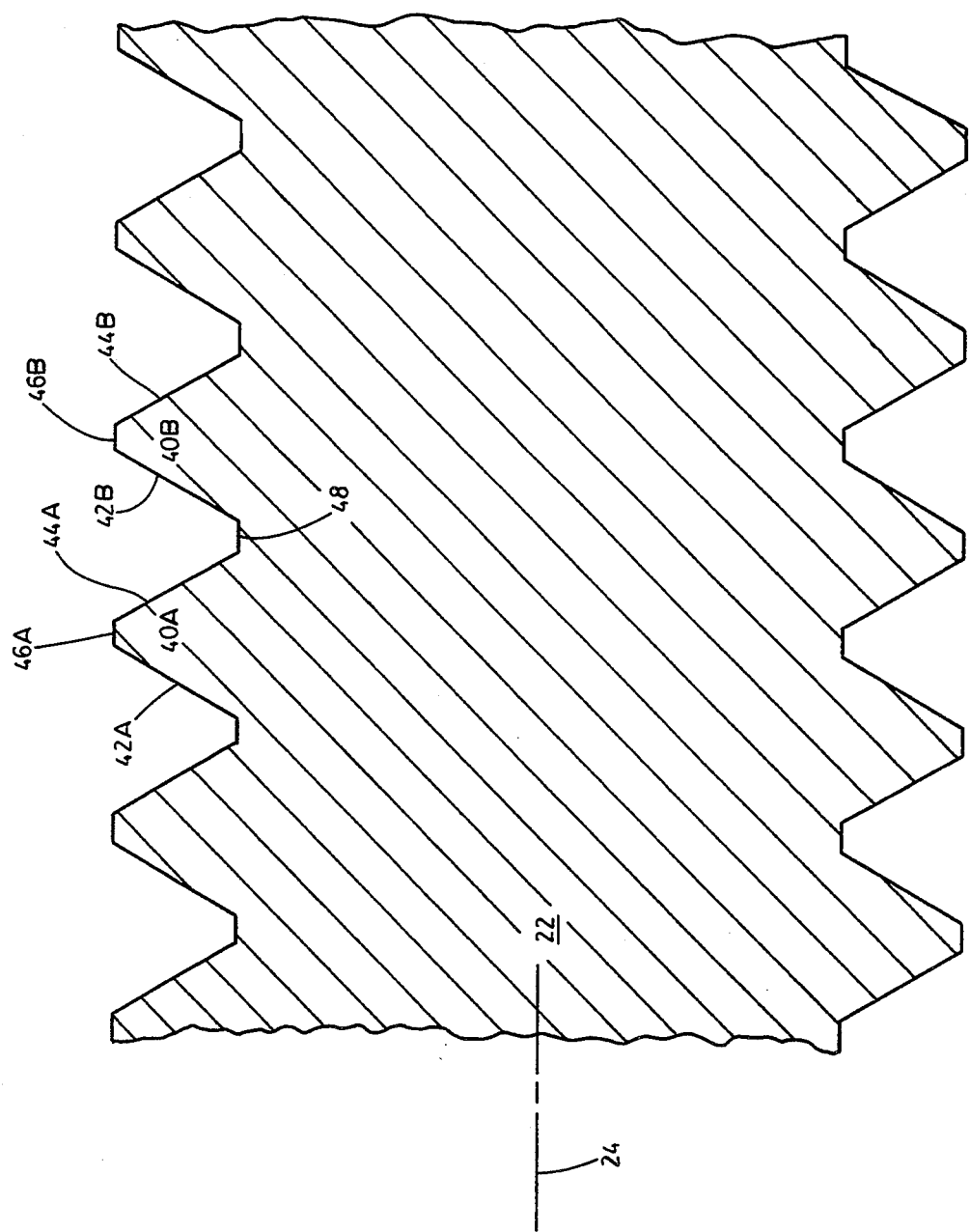
FIG. 4 is a fragmentary, longitudinal cross-section of the radial extrusion thread-forming screw showing typical adjacent load-bearing threads.

FIG. 4 shows an enlarged section detail of typical adjacent threads 40A and 40B of the load-bearing threads 34. The thread 40A includes a first flank 42A and a second flank 44A that are inclined at angles to meet at a crest 46A. Similarly, the thread 40B which is immediately adjacent the thread 40A has a first flank 42B and a second flank 44B that are inclined at angles to meet at a crest 46B. The second flank 44A of the thread 40A and the first flank 42B of the thread 40B meet at a root 48. It is to be understood that the individual adjacent threads 40A and 40B are representative of only two of the load-bearing threads 34, and that the load-bearing threads 34 may constitute a plurality of substantially identical, successive threads that advance circumferentially in a helix about the axis 24 toward the second end 28 and that further advance between one first end 26 and the second end 28, the number of the load-bearing threads 34 depending on the length of the shank 22 or the profile and size of the load-bearing threads 34. An imaginary cylinder that would bound the crests 46A and 46B (and other crests of the load-bearing threads 34) is commonly referred to as a "major cylinder" and an imaginary cylinder that would bound the root 48 (and other roots of the main threads 34) is commonly referred to as a "minor cylinder." The "height" of a thread is the distance, measured radially, between the major and minor cylinders. The "major diameter" and the "minor diameter" are the diameters of the "major cylinder" and "minor cylinder," respectively. For the case depicted in FIG. 4, the crests 46A and 46B are somewhat flattened, that is, the flanks 42A and 44A, and the crests 42B and 44B, do not meet to form a sharp V-type intersection. If the flanks 42A and 44A, and the flanks 42B and 44B, were extended by an imaginary line to a sharp V-type intersection, such intersection is commonly referred to as a "sharp crest" and an imaginary cylinder that would bound the sharp crests is commonly referred to as a "sharp major cylinder." Further, for the case depicted in FIG. 2A, the root 48 is somewhat flattened, that is, the flanks 44A and 42B do not meet to form a sharp V-type intersection. If the flanks 44A and 42B were extended by an imaginary line to a sharp V-type intersection, such intersection is commonly referred to as a "sharp root," and an imaginary cylinder that would bound the sharp roots is commonly referred to as a "sharp minor cylinder." It is to be understood that, for the case of a sharp V-thread screw, the "major cylinder" and the "sharp major cylinder" would be the same. Similarly for the case of a sharp V-thread screw, the "minor cylinder" and the "sharp minor cylinder" would also be the same. The "pitch cylinder" of the screw is located equidistantly between the sharp major and minor cylinders of a given thread form. The "pitch diameter" is the diameter of the pitch cylinder. The above definitions are exemplary as applied to the load-bearing threads 34, and apply to the lead thread or threads, 36, the pilot threads 37, and the forming thread 38. Though the figures show the load-bearing threads 34 to be contiguous, it is to be understood that other threadforms are possible and within the scope of the present invention, for example, spaced threads, multiple lead threads, and asymmetric threads.

The lead thread or threads 36 are formed at the first end 26 of the cylindrical shank, the lead threads 36 being fully formed at the crest but not fully formed at the root. The lead threads 36 are chamfered such that a "major cone" is formed, analogous to the "major cylinder" of the main threads 34. For the case of the lead threads 36, the "major diameter" at a given position on the axis 24 is the diameter of the "major cone" at that position.

The pilot threads 37 are located intermediate the lead thread 36 and the load-bearing threads 34. The pilot threads 37 constitute a plurality of substantially identical, successive threads that advance circumferentially in a helix about the axis 24 toward the second end 28 and that further advance between the first end 26 and the second end 28. A major cylinder is again formed by crests of the pilot threads 37, and a minor cylinder is again formed by the roots of the pilot threads 37. The major diameter of the pilot threads 37 and the minor diameter of the pilot threads 37 are the diameters of the major cylinder of the pilot threads 37 and the minor cylinder of the pilot threads 37. The pilot threads 37 are discussed in greater detail below.

The forming thread 38 is located intermediate the lead threads 36 and the load-bearing threads 34, and more specifically, intermediate the pilot threads 37 and the load-bearing threads 34. The forming thread 38 is spiroid tapered about its circumference such that its major diameter increases as the forming thread 38 advances toward the second end 28.

While the spiroid helix forming thread 38 represents one practical carrier for the individual forming elements 50, an option of radially constant clearance arcs which are stepped incrementally following each of the forming elements 50 may be created in the thread-forming die using impressment, electrical discharge machining, electro-chemical material removal, roll forming or other suitable methods. The forming thread 38 further includes a plurality of forming elements 50 which are preferably configured to optimize the movement of material in the workpiece upon the screw 20 being driven to form internal threads. The forming thread 38 and the forming elements 50 are discussed in greater detail below.

For the sake of clarification, the crest of the lead thread or threads 36 defines a first major diameter such that the first major diameter at a given position on the lead thread or threads 36 is the diameter of the major cone and the root of the lead thread define a first minor diameter. The crests and the roots of the load-bearing threads 34 define a second major diameter and a second minor diameter, respectively, such that the second major diameter and the second minor diameter are the diameters of a first major cylinder and a second major cylinder, respectively. The crests and the roots of the pilot threads 37 define a third major diameter and a third minor diameter, respectively, such that the third major diameter and the third minor diameter are the diameters of a second major cylinder and a second minor cylinder, respectively. The crests and the roots of the forming thread 38 define a fourth major diameter and a fourth minor diameter, respectively, such that the fourth major diameter and the fourth minor diameter are the diameters of a third major cylinder and a third minor cylinder, respectively.

Figure 5:
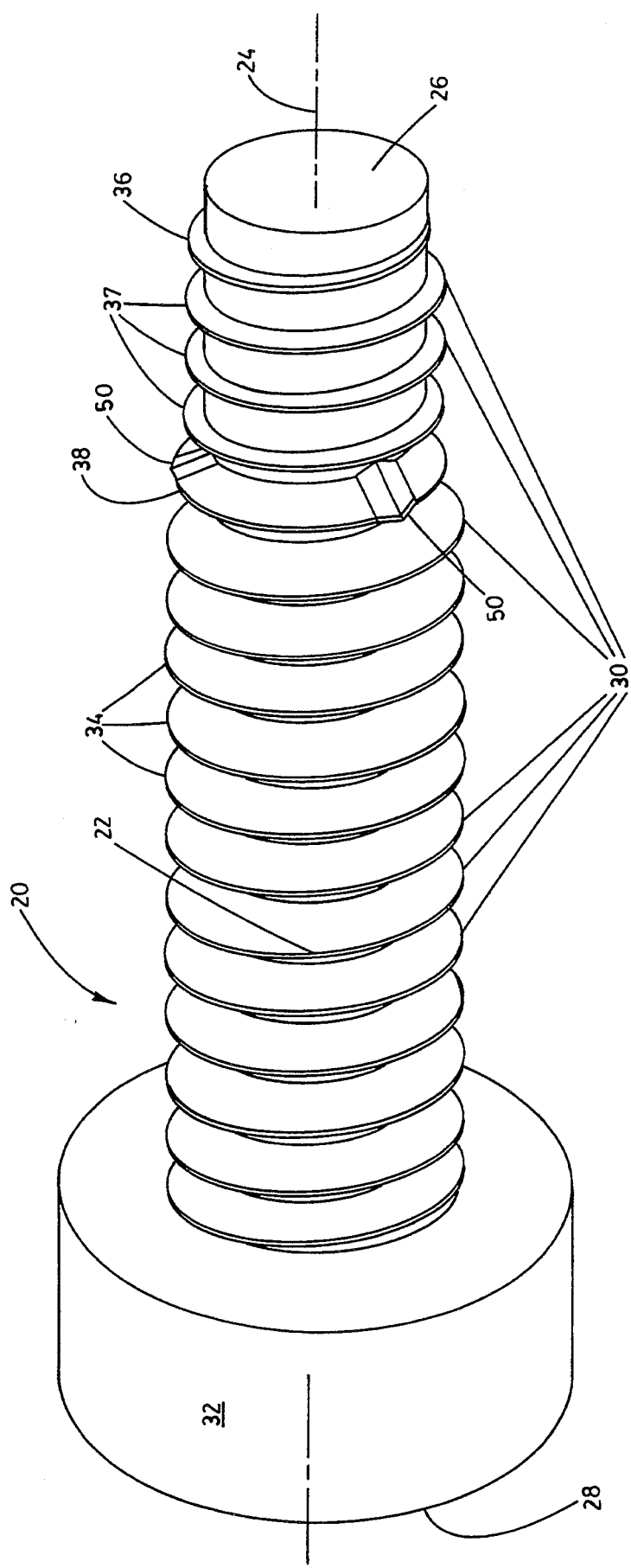
FIG. 5 is an isometric perspective view of an alternate radial extrusion thread-forming screw having three equally-spaced thread-forming elements in accordance with the present invention.
Figure 7:
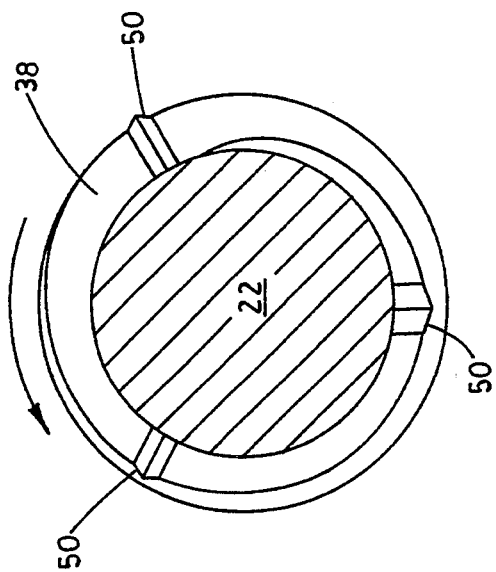
FIG. 7 is a lateral helical cross-section taken along line 7—7 of FIG. 6.
Figure 6:
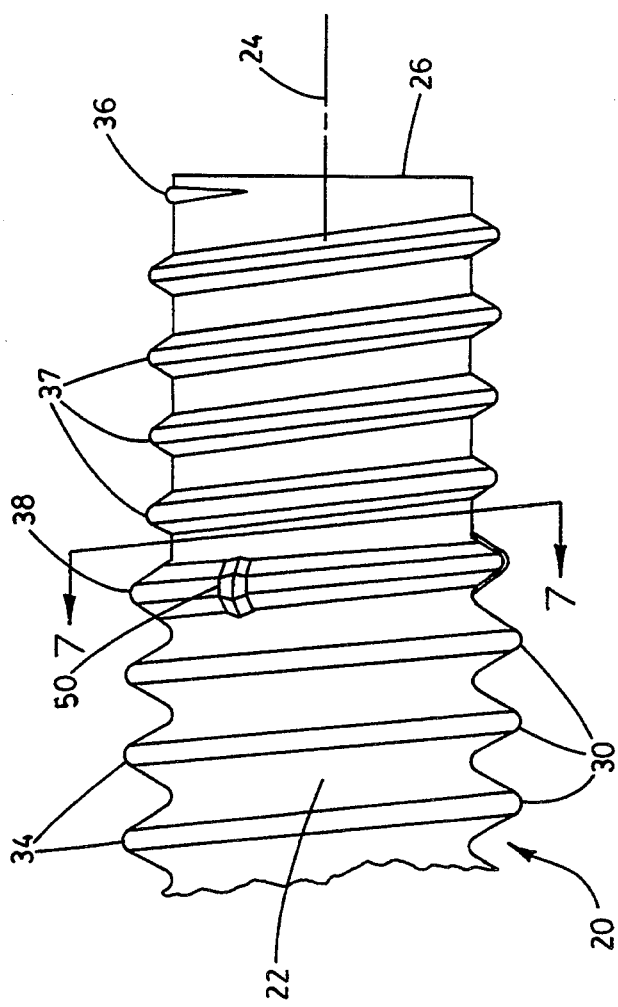
FIG. 6 is a fragmentary, side elevational view of the radial extrusion thread-forming screw of FIG. 5 showing the lead thread, the pilot threads, the forming thread, and certain of the load-bearing threads proximate the forming thread.
Figure 8:
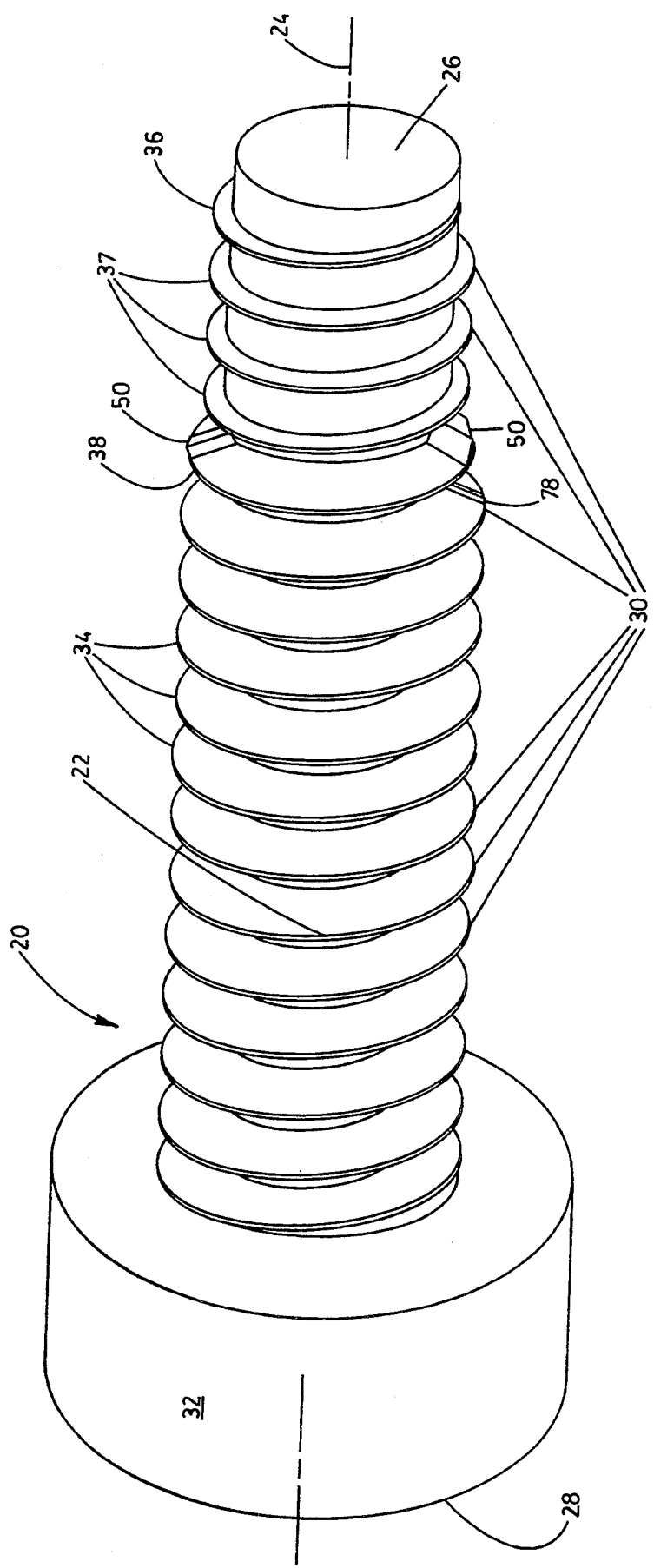
FIG. 8 is an isometric perspective view of a second alternate thread-forming screw having two equally-spaced thread forming elements in accordance with the present invention.
Figure 10:
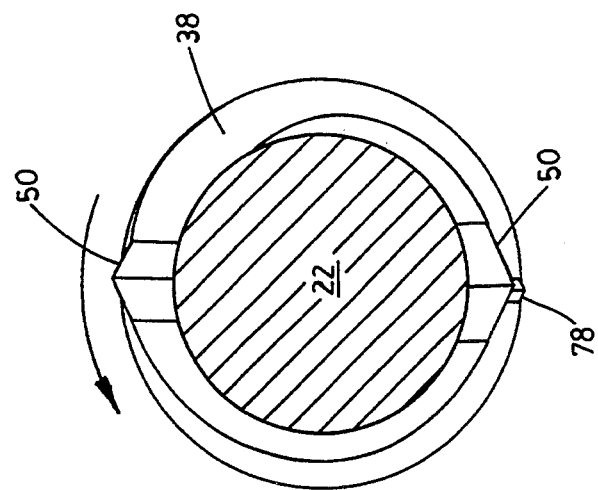
FIG. 10 is a lateral helical cross-section taken along line 10—10 of FIG. 9.
Figure 9:
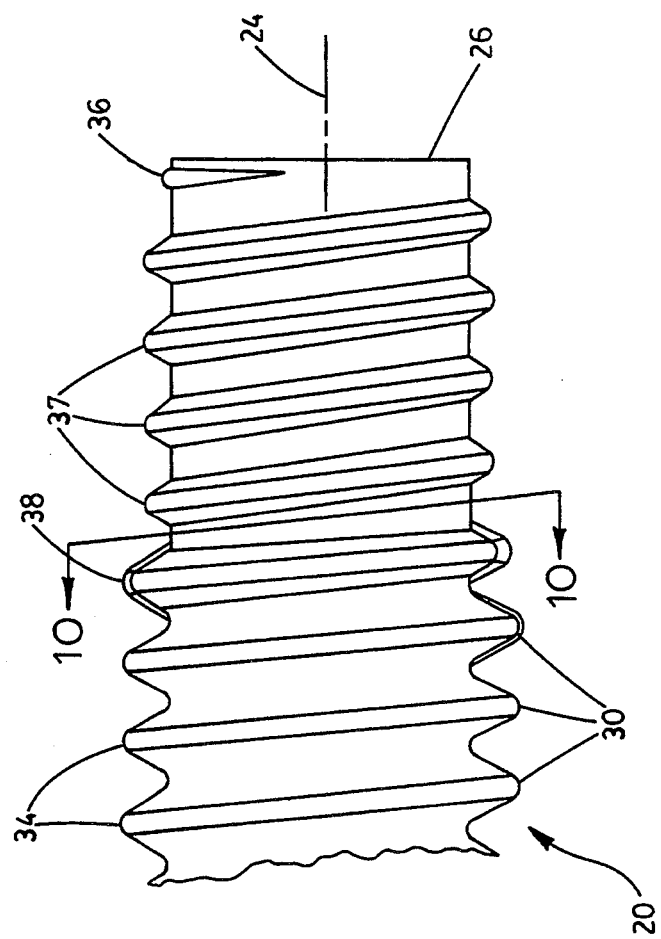
FIG. 9 is a fragmentary, side elevational view of the radial extrusion thread-forming screw of FIG. 8 showing the lead thread, the pilot threads, the forming thread, and certain of the load-bearing threads proximate the forming thread.
Figure 11:
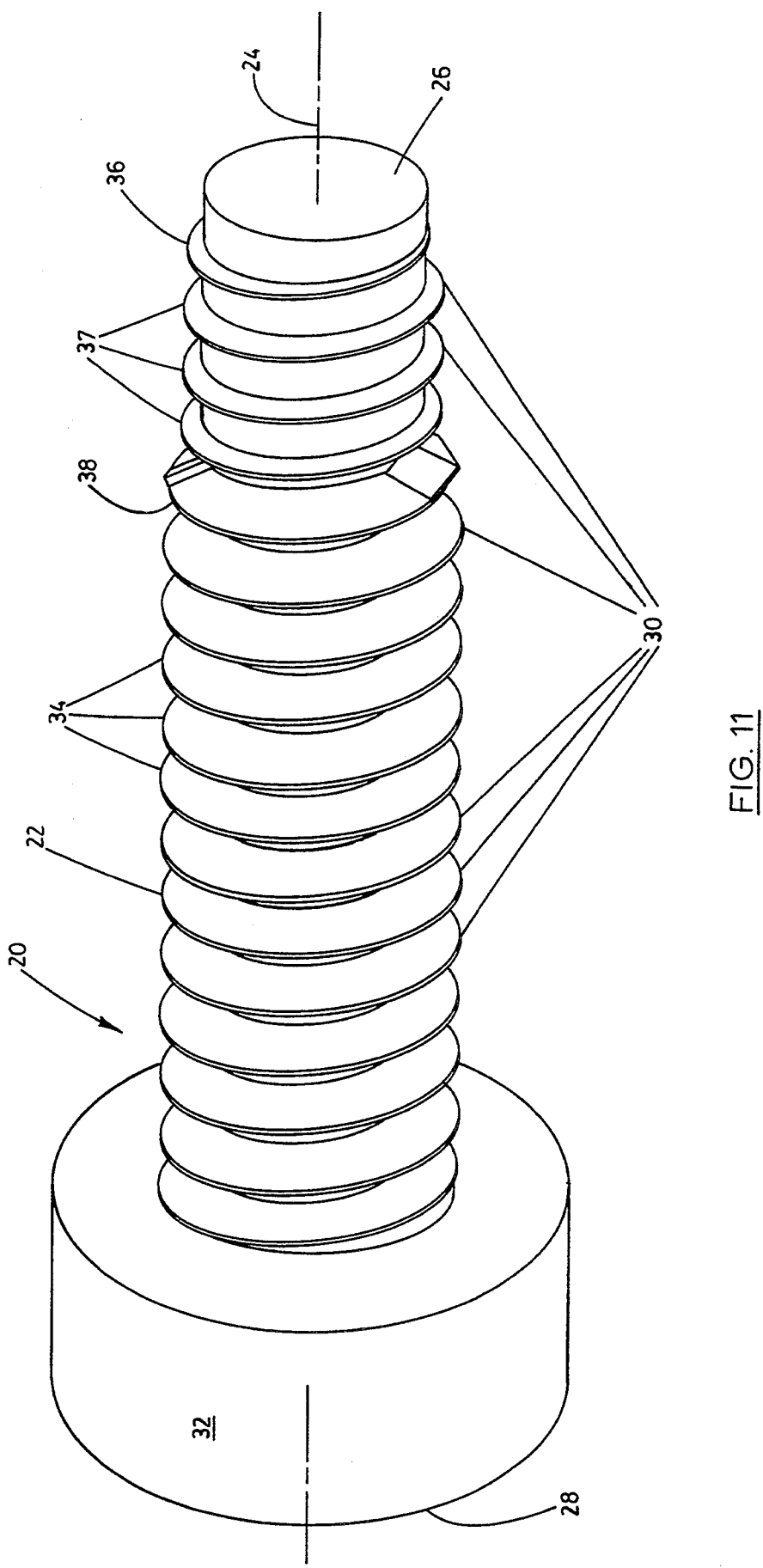
FIG. 11 is an isometric perspective view of a third alternate radial extrusion thread-forming screw having one thread-forming element in accordance with the present invention.
Figure 12:
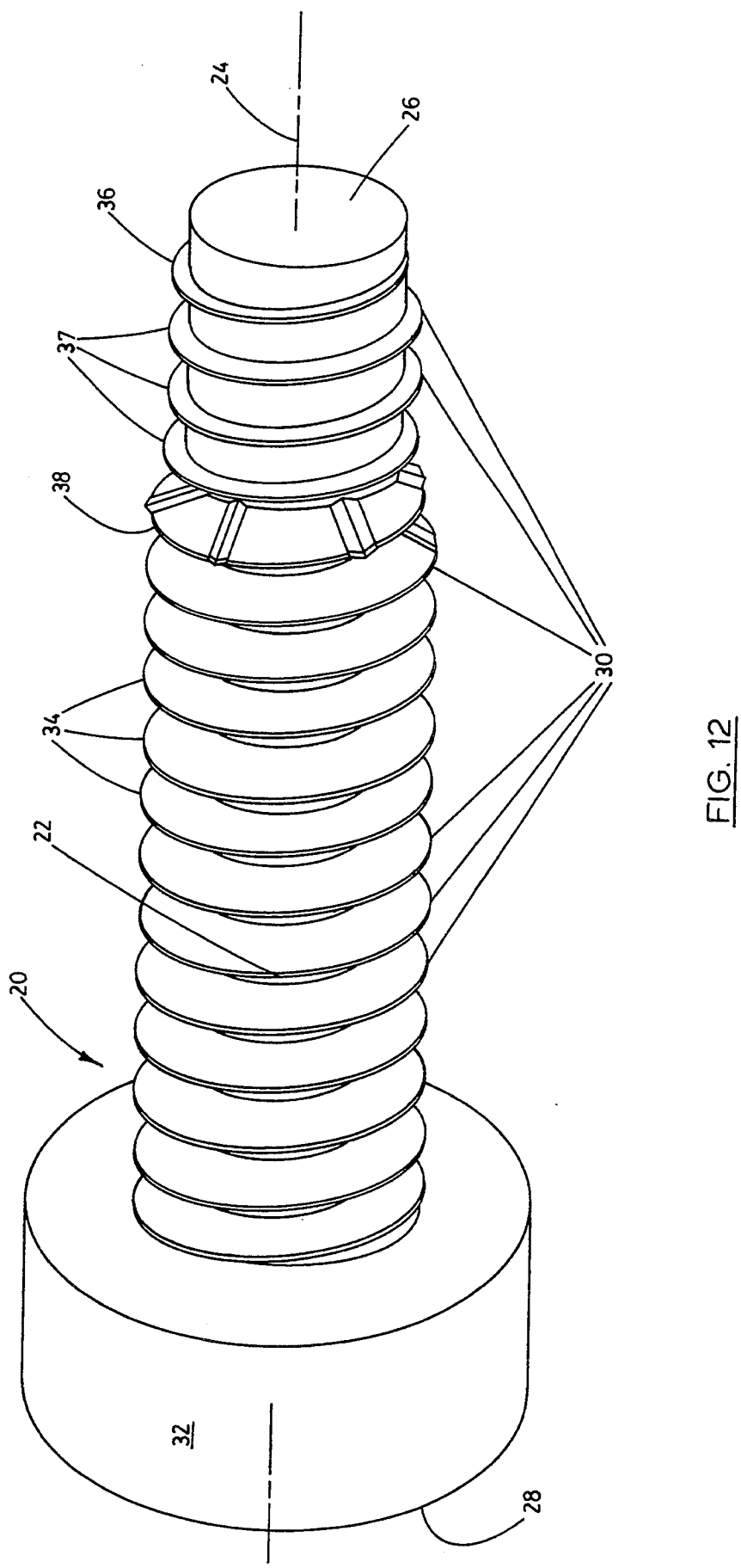
FIG. 12 is an isometric perspective view of a fourth alternate radial extrusion thread-forming screw having five equally-spaced thread-forming elements in accordance with the present invention.

The forming elements 50 are preferably arranged such that they are spaced in a substantially circumferentially equidistant relationship form relative to each other upon the forming thread 38. FIGS. 1–3 illustrate a preferred form in which there are four forming elements 50 located about the circumference of the forming thread 38. Other figures show alternate numbers of forming elements. FIGS. 5–7 show an alternate radial thread-forming screw having three equally-spaced thread-forming elements 50 upon the circumference of the forming thread 38. FIGS. 8–10 show a second alternate radial thread-forming screw having two equally-spaced thread-forming elements 50 upon the circumference of the forming thread 38; FIG. 11 shows a third alternate radial thread-forming screw having one thread-forming element 50 upon the circumference of the forming thread 38; and FIG. 12 shows a fourth alternate radial thread-forming screw having five thread-forming elements 50 upon the circumference of the forming thread 38. The load-bearing threads 34, lead thread or threads 36, and the pilot threads 37 do not have any forming elements 50 located thereupon.

FIGS. 14, 14A and 15 show views of the forming element 50 as located upon the forming thread 38. The forming thread 38 further includes a first flank 52 and a second flank 54 which meet to form the crest of the forming thread 38. When the article is positioned to be turned into the workpiece, the first flank 52 is oriented to face the workpiece and the second flank 54 is oriented to oppose the workpiece. Each of the forming elements 50 include a first planar surface 56 and a second planar surface 58 which are inclined and which intersect to form an apex 60. As shown in the figures, the apex 60 has a length 62 which extends over the first and the second flanks 52 and 54, respectively. If lines are projected to extend from the first and second planar surfaces 56 and 58, respectively, an included angle is formed. The geometry of the forming elements 50 is configured to promote deformation along the atomic or molecular lattice grain boundaries, or slip planes, in the material of the workpiece upon turning of the article into the workpiece. Accordingly, an included angle of between 120° and 150° is found to be preferable in the present invention to accomplish such deformation along the slip planes of the material. As shown in FIGS. 14, 14A and 15, the length 62 of the apex 60 is oriented perpendicular to the spiroid helix of the forming thread 34. FIG. 17 shows an alternate forming element 50 in which the length 62 of the apex forms an angle between 10° and 30° relative to projected line which is perpendicular to the spiroid helix of the forming thread 38, such angle being bisected by the crest of the forming thread 38. In the latter embodiment of FIGS. 17 and 18, the angle "points" in the direction that the article is turned into the workpiece. FIG. 15A shows another alternate embodiment in which the inclined surfaces are slightly rounded. It is to be understood there may be other configurations of forming elements 50 which also promote deformation along slip planes in the workpiece material and it is not intended that the present invention be strictly limited to those versions depicted herein.

The forming thread 38 plus the final thread forming element 50 will be identical in profile to the following load-bearing threads 34 except that the final thread forming element 50 will be radially larger in height by 0.0025 to 0.080 millimeters than the load-bearing thread 34.

Figure 16:
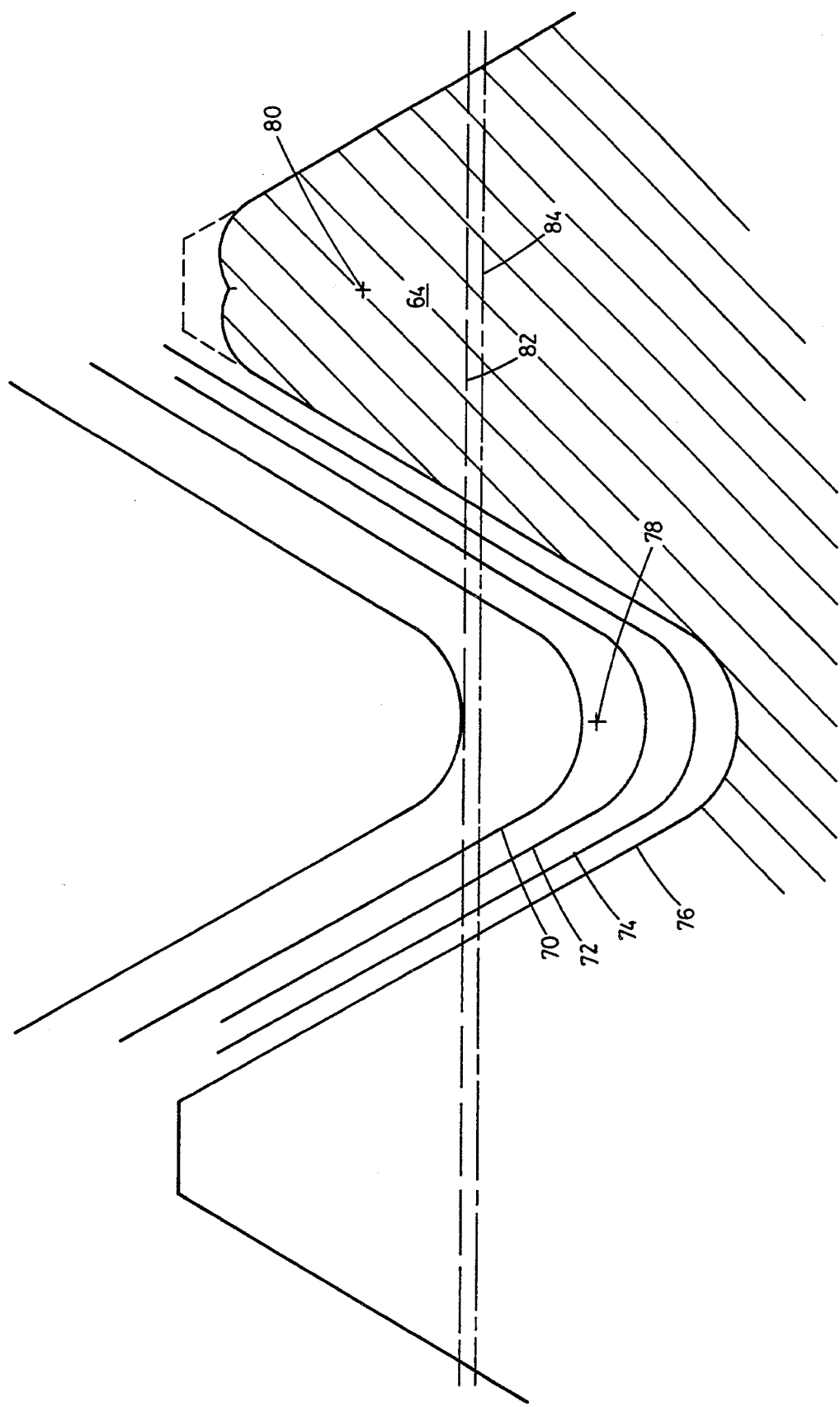
FIG. 16 is a longitudinal cross-section of the radial extrusion thread-forming screw having four forming elements, showing each of four extrusions, illustrating the dedendum depth after passage of each of the forming elements.

In a process where an article, such as a screw, is turned into a workpiece and results in cold-forming and simultaneous work-hardening of the material into which the screw 20 being driven to form internal threads, successive deformation increments create increased strain hardening of the workpiece material, requiring a progressively greater degree of force. Because of the recognized strain-hardening of the workpiece, the taper in the forming thread 38 is deliberately designed such that each of the forming elements 50 require substantially the same amount of force to move its respective material in the workpiece. The principle herein described decreases the area of workpiece deformation with each subsequent forming element, proportional to the strain hardening exponent of the workpiece material, thus balancing the force experienced by each forming element. Friction forces are similarly equated among the forming elements by the proportional area reductions. By the taper in the forming thread 38, the forming elements 50 are thereby arranged such that the first forming element contacting the surface of the workpiece moves the greatest amount of material, the second forming element moves less material, the third forming element moves even less, etc. For example, where there are four forming elements 50A, 50B, 50C, and 50D, the first forming element 50A contacting the surface of the workpiece material may penetrate 40% of the total displaced thread depth, the second forming element 50B may penetrate 23% of the total displaced thread depth, the third forming element 50C may penetrate 20% of the total displaced thread depth, and the fourth forming element 50D may penetrate 17% of the total displaced thread depth. Despite the differences in the material being moved, each of the forming elements 50A, 50B, 50C and 50D require substantially the same deformation force to move through the material of the workpiece because of the aforementioned strain-hardening encountered by succeeding forming elements 50. Again for the case where there are four forming elements 50A, 50B, 50C, and 50D (shown in FIG. 3), FIG. 16 illustrates the extrusions made by each of the forming elements 50A, 50B, 50C, and 50D in a workpiece 64. The extrusion made by the first forming element 50A is shown at 70, the extrusion made by the second forming element 50B is shown at 72, the extrusion made by the third forming element 50C is shown at 74, and the final extrusion made by the fourth forming element 50D to arrive at the total dedendum depth in the forming of the screw threads shown at 76. For reference purposes, the centroid of a typical dedendum thread is shown at 78, the centroid of a typical addendum thread is shown at 80, the diameter of the workpiece hole is shown at 82, and the pitch diameter is shown at 84. The idealized thread profile is shown in dotted lines, though it is to be understood that the actual thread profile represented by the material moved in the workpiece is something more akin to that which is represented. As the screw 20 is turned and the material of the workpiece is being moved, the geometry of the forming elements 50 and the taper in the forming thread 38 create an area of stress relief behind each forming element 50. Friction during the fastener assembly with the workpiece is minimized by creating clearance between each forming element 50, the final forming element 50D, and the load-bearing threads 34. The turning of the screw 20 results in multiple compressive loading and unloading forces. The present invention produces elastic recovery and strain reduction in the turning of the screw 20, as compared to the prior art screw design.

Because of the unique arrangement of the forming elements 50 to equalize the deformation forces among the forming elements 50, with a good surface finish upon the screw 20, the result is the formation of threads in the workpiece which are close to perfect. The iterative action of the screw 20 as it forms successive threads in the workpiece reduces the friction in the forming of the threads because of: (a) the identity of interface between the workpiece and the screw 20 (that is, by the creation of near-perfect threads in the workpiece), and (b) the surface finish of the screw 20. As compared with Taptite ® and other thread geometries, starting torque, driving torque, and seating torque are all decreased proportionally.

FIGS. 8–10 also show an optional additional sizing element 78 which ensures clearance or relief to avoid friction during engagement of the load-bearing threads 34. The sizing element 78 does not form threads such as does the forming elements 50 and the radial protrusion of the sizing element 78 is only slightly larger than the height of the load-bearing threads 34. The sizing element 78 is located 180° from the final forming element 50 and displaces less material than the final forming element as well.

Figure 13:
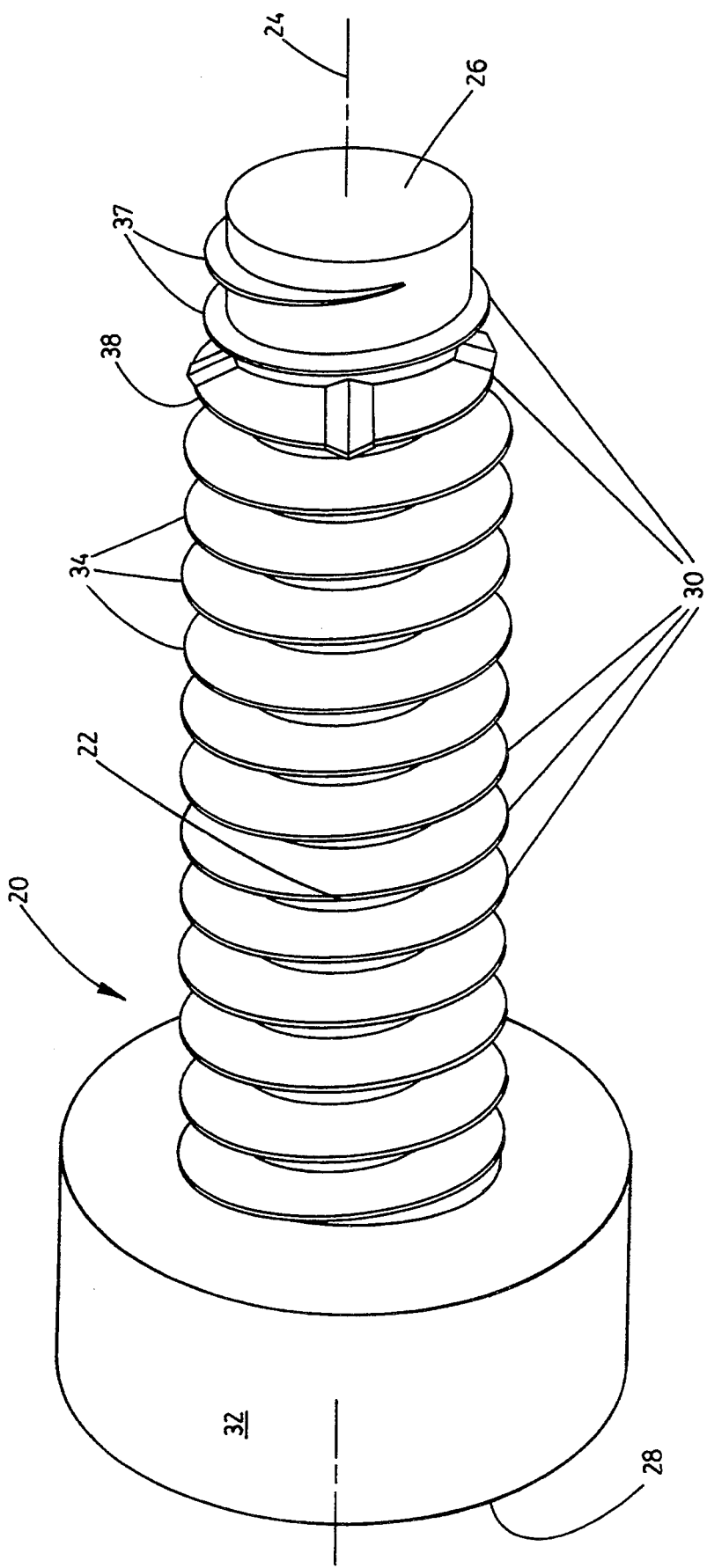
FIG. 13 is an isometric perspective view of a fifth alternate radial extrusion thread-forming screw having four equally-spaced thread-forming elements and no pilot threads, in accordance with the present invention.

The screw 20 may also optionally incorporate the pilot threads 37. The figures generally show the screw 20 having the pilot threads 37, though FIG. 13 shows the case of the present invention without the pilot threads 37. Using the above-specified terms, the fourth major cylinder as defined by the fourth major diameter of the pilot threads 37 is of a lesser dimension than the second major cylinder of the load-bearing threads 34. The pilot threads 37 are uniform in their dimensions and engage the hole of the workpiece prior to the load-bearing threads 34. The engagement of the pilot threads with the hole of the workpiece is slight, and properly aligns the screw 20 within the hole of the workpiece prior to the more significant engagement of the workpiece by the load-bearing threads 34 or the forming thread 38. The major diameter of the pilot threads 37 is designed to positively engage the workpiece so as to ensure axial alignment with the workpiece at the start of the main thread forming section 38. To accomplish this, the minimum fourth major diameter will be dimensioned such that it will exceed the workpiece hole maximum inside diameter by a minimum of 0.013 millimeters, slightly less for miniature screws, larger for structural fasteners. The alignment of the screw 20 within the workpiece also serves to minimize the driving torque necessary to engage the screw 20 with the workpiece, as misalignment may require expenditure of additional force to attempt to realign the screw 20.

It is further to be understood that the invention is not confined to the particular construction and arrangement of parts herein illustrated and described, but embraces such modified forms thereof as come within the scope of the following claims.

What is claimed is:

1. An article for forming internal threads in a workpiece, the article comprising:
   (a) a cylindrical shank directed along an axis and having a first end and a second end;
   (b) a plurality of threads located upon the cylindrical shank, each of the threads having a crest and a root, the threads including
      (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;
      (ii) load-bearing threads beginning at the first end adjacent the lead thread and advancing circumferentially in a helix about the axis toward the second end, and wherein the crests and the roots of the load-bearing threads define a second major diameter and a second minor diameter, respectively, and further wherein the second major diameter and the second minor diameter are the diameters of a major cylinder and a minor cylinder;
      (iii) a forming thread located intermediate the lead thread and the load-bearing threads and advancing circumferentially in a helix toward the second end, the forming thread having a plurality of forming elements that extend outwardly from the forming thread and which are spaced substantially circumferentially equidistant from each other, said forming elements having an outermost portion, and wherein each successive forming element moves a progressively decreasing amount of material from the workpiece to form the internal threads while each successive forming element's outermost portion increases in distance from the axis of the cylindrical shank; and wherein except for the forming thread, the lead thread and the load-bearing threads do not have any forming elements; and
   (c) means for engaging the cylindrical shank to rotate the cylindrical shank about the axis and turn the article into the workpiece, the means for engaging being located at the second end.

2. The article of claim 1 wherein there are two forming elements on the forming thread.

3. The article of claim 1 wherein there are three forming elements on the forming thread.

4. The article of claim 1 wherein there are four forming elements on the forming thread.

5. The article of claim 1 wherein there are five forming elements on the forming thread.

6. The article of claim 1 wherein the article is a screw.

7. The article of claim 1 wherein the forming elements are shaped to promote deformation along slip planes in the material of the workpiece upon turning of the article into the workpiece.

8. An article for forming internal threads in a workpiece, the article comprising:
   (a) a cylindrical shank directed along an axis and having a first end and a second end;
   (b) a plurality of threads located upon the cylindrical shank, each of the threads having a crest and a root, the threads including
      (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;
      (ii) load-bearing threads beginning at the first end adjacent the lead thread and advancing circumferentially in a helix about the axis toward the second end, and wherein the crests and the roots of the load-bearing threads define a second major diameter and a second minor diameter, respectively, and further wherein the second major diameter and the second minor diameter are the diameters of a major cylinder and a minor cylinder;
      (iii) a forming thread located intermediate the lead thread and the load-bearing threads and advancing circumferentially in a helix toward the second end, the forming thread having a plurality of forming elements that extend outwardly from the forming thread and which are spaced substantially circumferentially equidistant from each other, the crest of the forming thread defining a third major diameter and the forming thread being tapered about its circumference such that the third major diameter increases as it advances toward the second end, and wherein except for the forming thread, the lead thread and the load-bearing threads do not have any forming elements; and
   (c) means for engaging the cylindrical shank to rotate the cylindrical shank about the axis and turn the article into the workpiece, the means for engaging being located at the second end.

9. An article for forming internal threads in a workpiece, the article comprising;
   (a) a cylindrical shank directed along an axis and having a first end and a second end;
   (b) a plurality of threads located upon the cylindrical shank, each of the threads having a crest and a root, the threads including
      (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;
      (ii) load-bearing threads beginning at the first end adjacent the lead thread and advancing circumferentially in a helix about the axis toward the second end, and wherein the crests and the roots of the load-bearing threads define a second major diameter and a second minor diameter, respectively, and further wherein the second major diameter and the second minor diameter are the diameters of a major cylinder and a minor cylinder;

(iii) a forming thread located intermediate the lead thread and the load-bearing threads and advancing circumferentially in a helix toward the second end, the forming thread having a plurality of forming elements that extend outwardly from the forming thread and which are spaced substantially circumferentially equidistant from each other, said forming elements being shaped to promote deformation along slip planes in the material of the workpiece upon turning of the article into the workpiece, and wherein said forming thread includes a first flank and a second flank which meet to form the crest of the forming thread, the first flank being oriented to face the workpiece and the second flank opposing the workpiece when the article is turned into the workpiece, and wherein each of the forming elements include a first planar surface and a second planar surface which are inclined and which intersect to form an apex having a predetermined length, which extends across the first flank, and wherein except for the forming thread, the lead thread and the load-bearing threads do not have any forming elements; and (c) means for engaging the cylindrical shank to rotate the cylindrical shank about the axis and turn the article into the workpiece, the means for engaging being located at the second end.

10. The article of claim 9 wherein an included angle is formed by a projected extension of the first planar surface and the second planar surface, and the included angle is between 120° and 150°.

11. The article of claim 9 wherein the length of the apex extends across the first flank and the second flank.

12. The article of claim 9 wherein the length of the apex is perpendicular to the spiroid helix of the forming thread.

13. The article of claim 9 wherein the length of the apex is at an angle between 10° and 30° of a projected line which is perpendicular to the spiroid helix of the forming thread.

14. An article for forming internal threads in a workpiece, the article comprising:

(a) a cylindrical shank directed along an axis and having a first end and a second end;

(b) a plurality of threads located upon the cylindrical shank, each of the threads having a crest and a root, the threads including (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;

(ii) load-bearing threads beginning at the first end adjacent the lead thread and advancing circumferentially in a helix about the axis toward the second end, and wherein the crests and the roots of the load-bearing threads define a second major diameter and a second minor diameter, respectively, and further wherein the second major diameter and the second minor diameter are the diameters of a major cylinder and a minor cylinder;

(iii) a forming thread located intermediate the lead thread and the load bearing threads, and advancing circumferentially in a helix toward the second end, the forming thread having a plurality of forming elements that extend outwardly from the forming thread and which are spaced substantially circumferentially equidistant from each other, and wherein the crest of the forming thread defines a third major diameter and the forming thread is tapered about its circumference such that the third major diameter increases as it advances toward the second end; and (c) means for engaging the cylindrical shank to rotate the cylindrical shank about the axis and turn the article into the workpiece, the means for engaging being located at the second end.

15. The article of claim 14 wherein there are two forming elements on the forming thread.

16. The article of claim 14 wherein there are three forming elements on the forming thread.

17. The article of claim 14 wherein there are four forming elements on the forming thread.

18. The article of claim 14 wherein there are five forming elements on the forming thread.

19. The article of claim 14 wherein the article is a screw.

20. The article of claim 14 wherein the forming elements are shaped to promote deformation along slip planes in the material of the workpiece upon turning of the article into the workpiece.

21. The article of claim 20 wherein the forming thread includes a first flank and a second flank which meet to form the crest of the forming thread, and wherein the first flank is oriented to face the workpiece and the second flank opposes the workpiece when the article is turned into the workpiece, and wherein each of the forming elements include a first planar surface and a second planar surface which are inclined and which intersect to form an apex having a predetermined length which extends across the first flank.

22. The article of claim 21 wherein an included angle is formed by a projected extension of the first planar surface and the second planar surface, and the included angle is between 120° and 150°.

23. The article of claim 21 wherein the length of the apex extends across the first flank and the second flank.

24. The article of claim 21 wherein the length of the apex is perpendicular to the spiroid helix of the forming thread.

25. The article of claim 21 wherein the length of the apex is at an angle between 10° and 30° of a projected line which is perpendicular to the spiroid helix of the forming thread.

26. The article of claim 14 wherein the article is a screw.

27. An article for forming internal threads in a workpiece, the article comprising:

(a) a cylindrical shank directed along an axis and having a first end and a second end;

(b) a plurality of threads located upon the cylindrical shank, each of the threads having a crest and a root, the threads including (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;

(ii) load bearing threads beginning at the first end adjacent the lead thread and advancing circumferentially in a helix about the axis toward the second end, and wherein the crests and the roots of the load bearing threads define a second major diameter and a second minor diameter, respectively, and further wherein the second major diameter and the minor diameter are the diameters of a major cylinder and a minor cylinder;

(iii) a forming thread located intermediate the lead thread and the load bearing threads and advancing circumferentially in a helix toward the second end, the forming thread having a plurality of forming elements that extend outwardly from the forming thread and which are spaced substantially circumferentially equidistant from each other, and wherein the forming elements are shaped to promote deformation along slip planes in the material of the workpiece upon turning of the article into the workpiece, said forming elements having an outermost portion, and wherein each successive forming element moves a progressively decreasing amount of material from the workpiece to form the internal threads while each successive forming element's outermost portion increases in distance from the axis of the cylindrical shank; and (c) means for engaging the cylindrical shank to rotate the cylindrical shank about the axis and turn the article into the workpiece, the means for engaging being located at the second end.

28. An article for forming internal threads in a workpiece, the article comprising:

(a) a cylindrical shank directed along an axis and having a first end and a second end;

(b) a plurality of threads located upon the cylindrical shank, each of the threads having a crest and a root, the threads including (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;

(ii) load bearing threads beginning at the first end adjacent the lead thread and advancing circumferentially in a helix about the axis toward the second end and wherein the crests and the roots of the load bearing, threads define a second major diameter and a second minor diameter, respectively, and further wherein the second major diameter and the minor diameter are the diameters of a major cylinder and a minor cylinder;

(iii) a forming thread located intermediate the lead thread and the load bearing threads and advancing circumferentially in a helix toward the second end, the forming thread having a plurality of forming elements that extend outwardly from the forming thread and which are spaced substantially circumferentially equidistant from each other, and wherein the foxing elements are shaped to promote deformation along slip planes in the material of the workpiece upon turning of the article into the workpiece, the forming thread further including a first flank and a second flank which meet to form the crest of the forming thread, the first flank being oriented to face the workpiece and the second flank opposing the workpiece when the article is turned into the workpiece, and wherein each of the forming elements include a first planar surface and a second planar surface which are inclined and which intersect to form an apex having a length which extends across the first flank; and (c) means for engaging the cylindrical shank to rotate the cylindrical shank about the axis and turn the article into the workpiece, the means for engaging being located at the second end.

29. The article of claim 28 wherein an included angle is formed by a projected extension of the first planar surface and the second planar surface, and the included angle is between 120° and 150°.

30. The article of claim 28 wherein the length of the apex extends across the first flank and the second flank.

31. The article of claim 28 wherein the length of the apex is perpendicular to the spiroid helix of the forming thread.

32. The article of claim 28 wherein the length of the apex is at an angle between 10° and 30° of a projected line which is perpendicular to the spiroid helix of the forming thread.

33. The article of claim 27 wherein there are two forming elements on the forming thread.

34. The article of claim 27 wherein there are three forming elements on the forming thread.

35. The article of claim 27 wherein there are four forming elements on the forming thread.

36. The article of claim 27 wherein there are five forming elements on the forming thread.

37. An article for forming internal threads in a comprising:

(a) a cylindrical shank directed along an axis and having a first end and a second end;

(b) a plurality of threads located upon the cylindrical shank, each of the threads having a crest and a root, the threads including (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;

(ii) load bearing threads beginning at the first end adjacent the lead thread and advancing circumferentially in a helix about the axis toward the second end, and wherein the crests and the roots of the load bearing threads define a second major diameter and a second minor diameter, respectively, and further wherein the second major diameter and the minor diameter are the diameters of a major cylinder and a minor cylinder;

(iii) a forming thread located intermediate the lead thread and the load bearing advancing circumferentially in a helix toward the second end, the forming thread having a plurality of forming elements that extend outwardly from the forming thread and which are spaced substantially circumferentially equidistant from each other, and wherein the forming elements are shaped to promote deformation along slip planes in the material of the workpiece upon turning of the article into the workpiece, and wherein the crest of the forming thread defines a third major diameter and the forming thread is tapered about its circumference such that the third major diameter increases as it advances toward the second end; and (c) means for engaging the cylindrical shank to rotate the cylindrical shank about the axis and turn the article into the workpiece, the means for engaging being located at the second end.

38. An article for forming internal threads in a workpiece, the article comprising:
(a) a cylindrical shank directed along an axis and having a first end and a second end;
(b) a plurality of threads located upon the cylindrical shank, each of the threads having a crest and a root, the threads including
  (i) a lead thread beginning at the first end and advancing circumferentially in a spiroid helix about the axis and wherein the crest of the lead thread defines a first major diameter such that the first major diameter at a given position on the lead thread is a diameter of a major cone and wherein the root of the lead thread defines a first minor diameter;
  (ii) load-bearing threads beginning at the first end adjacent the lead thread and advancing circumferentially in a helix about the axis toward the second end, wherein the crests and the roots of the load-bearing threads define a second major diameter and a second minor diameter, respectively, and further wherein the second major diameter and the second minor diameter are the diameters of a first major cylinder and a first minor cylinder;
  (iii) pilot threads located intermediate the lead thread and the load-bearing threads and advancing circumferentially in a helix toward the second end, the pilot threads being uniform and wherein the crests and the roots of the pilot threads define a third major diameter and a third minor diameter, respectively, and wherein the third major diameter and third minor diameter are diameters of a second major cylinder and a second minor cylinder, the third major diameter being of a lesser dimension than the second major diameter to align the article with a hole in the workpiece prior to engagement of the load-bearing threads; and (c) means for engaging the cylindrical shank to rotate the cylindrical shank about the axis and turn the article into the workpiece, the means for engaging being located at the second end.

39. An article for forming internal threads in a workpiece, and wherein the article when turned into the workpiece results in cold forming and simultaneous work hardening of the workpiece, the article comprising:
  a cylindrical shank directed along an axis and having a first end, and an opposite second end;
  a lead thread borne by the cylindrical shank and beginning at the first end and extending in the direction of the second end;
  a load bearing thread borne by the cylindrical shank and beginning adjacent the lead thread and advancing in the direction of the second end; and
  a forming thread borne by the cylindrical shank and disposed intermediate the lead and load bearing threads, and wherein the forming thread has a plurality of forming elements which are oriented in substantially equidistant positions about the cylindrical shank, said forming elements having an outermost portion, and wherein each successive forming element moves a progressively decreasing amount of material from the workpiece to form the internal threads while each successive forming element's outermost portion increases in distance from the axis of the cylindrical shank, thereby requiring approximately the same driving torque to move the individual forming elements through the material.

* * * * *

UNITED STATES PATENT AND TRADEMARK OFFICE
CERTIFICATE OF CORRECTION

PATENT NO. : 5,385,439
DATED : January 31, 1995
INVENTOR(S) : Donald R. Hurdle

It is certified that error appears in the above—identified patent and that said Letters Patent is hereby corrected as shown below:

Col. 1, line 37, delete the word —snow— and insert —show—;
Col. 3, line 63, delete the word —jangle— and insert —angle—;
Col. 13, line 66, delete the word —foxing— and insert —forming—;
Col. 14, line 62, after the word "bearing" insert —threads and—.

Signed and Sealed this

Twenty-eight Day of March, 1995

*Attest:*

BRUCE LEHMAN

*Attesting Officer*     Commissioner of Patents and Trademarks